United States Patent
Hanawa et al.

(10) Patent No.: US 8,316,980 B2
(45) Date of Patent: Nov. 27, 2012

(54) HYBRID MOTORCYCLE

(75) Inventors: Kaoru Hanawa, Wako (JP); Takashi Tsutsumizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 239 days.

(21) Appl. No.: 12/879,020

(22) Filed: Sep. 10, 2010

(65) Prior Publication Data

US 2011/0073401 A1 Mar. 31, 2011

(30) Foreign Application Priority Data

Sep. 30, 2009 (JP) ................... 2009-228587

(51) Int. Cl.
*B62K 11/00* (2006.01)
(52) U.S. Cl. ................... 180/220; 180/65.21
(58) Field of Classification Search ........... 180/220, 180/65.21, 65.22, 65.26, 297, 337; 74/335, 74/336.5
See application file for complete search history.

(56) References Cited

U.S. PATENT DOCUMENTS

| 2002/0047459 A1* | 4/2002 | Adaeda et al. ........... 310/216 |
| 2007/0000469 A1* | 1/2007 | Liang et al. ........... 123/195 R |
| 2007/0256873 A1* | 11/2007 | Masuda et al. ........... 180/220 |
| 2008/0185205 A1* | 8/2008 | Kaminokado ........... 180/220 |
| 2010/0096205 A1* | 4/2010 | Nagao et al. ........... 180/219 |

FOREIGN PATENT DOCUMENTS

JP 2000-103384 4/2000
* cited by examiner

*Primary Examiner* — Tashiana Adams
(74) *Attorney, Agent, or Firm* — Ditthavong Mori & Steiner, P.C.

(57) ABSTRACT

A hybrid motorcycle includes a body frame, a front wheel, and a hybrid driving source. The hybrid driving source is mounted on the body frame between a head pipe and a swing arm pivot. The hybrid driving source includes an engine and a motor. The engine has a crankshaft whose axial direction is substantially parallel to a vehicle longitudinal direction. The motor is provided at a front shaft end adjacent to the front wheel.

17 Claims, 7 Drawing Sheets

HYBRID MOTORCYCLE

CROSS-REFERENCE TO RELATED APPLICATIONS

The present application claims priority under 35 U.S.C. §119 to Japanese Patent Application No. 2009-228587, filed Sep. 30, 2009. The contents of this application are incorporated herein by reference in their entirety.

BACKGROUND OF THE INVENTION

1. Technical Field

This invention relates to a hybrid motorcycle.

2. Background Art

There have been known hybrid motorcycles which are driven by a hybrid driving source comprised of an engine and a motor (for example, see JP-A No. 2000-103384 (FIG. 1 and FIG. 2)).

FIG. 1 of JP-A No. 2000-103384 shows that a hybrid power unit is swingably supported on a body frame of a scooter type motorcycle (hereinafter the numerals in parentheses indicate reference signs given in JP-A No. 2000-103384).

FIG. 2 of JP-A No. 2000-103384 shows that the hybrid power unit (P) is swingably provided integrally with a swing arm disposed in a rearward position of the vehicle body, a crankshaft (27) extends in the vehicle width direction, and a motor (110) is coupled with a shaft end of the crankshaft (27).

When the hybrid power unit described in JP-A No. 2000-103384 is applied to a non-scooter type motorcycle, particularly to a medium or large size motorcycle, since in a normal motorcycle particularly the power unit is fixed on a front part of the body frame, if the motor is located at a shaft end of the crankshaft and the crankshaft is long, in some cases it is impossible to obtain a sufficient vehicle bank angle and it may be difficult to design the size of a motor to be mounted depending on motor output as desired.

SUMMARY OF INVENTION

According to one aspect of the present invention, a hybrid motorcycle includes a body frame, a front wheel, and a hybrid driving source. The hybrid driving source is mounted on the body frame between a head pipe and a swing arm pivot. The hybrid driving source includes an engine and a motor. The engine has a crankshaft whose axial direction is substantially parallel to a vehicle longitudinal direction. The motor is provided at a front shaft end adjacent to the front wheel.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Next, embodiments of this invention will be described in detail. In the drawings and embodiments, words such as "top", "bottom", "front", "rear", "left", and "right" refer to directions as seen from the rider of the motorcycle. The drawings should be seen according to the orientations of reference signs.

EXAMPLES

An embodiment of the present invention will be described referring to drawings.

Figure 1:
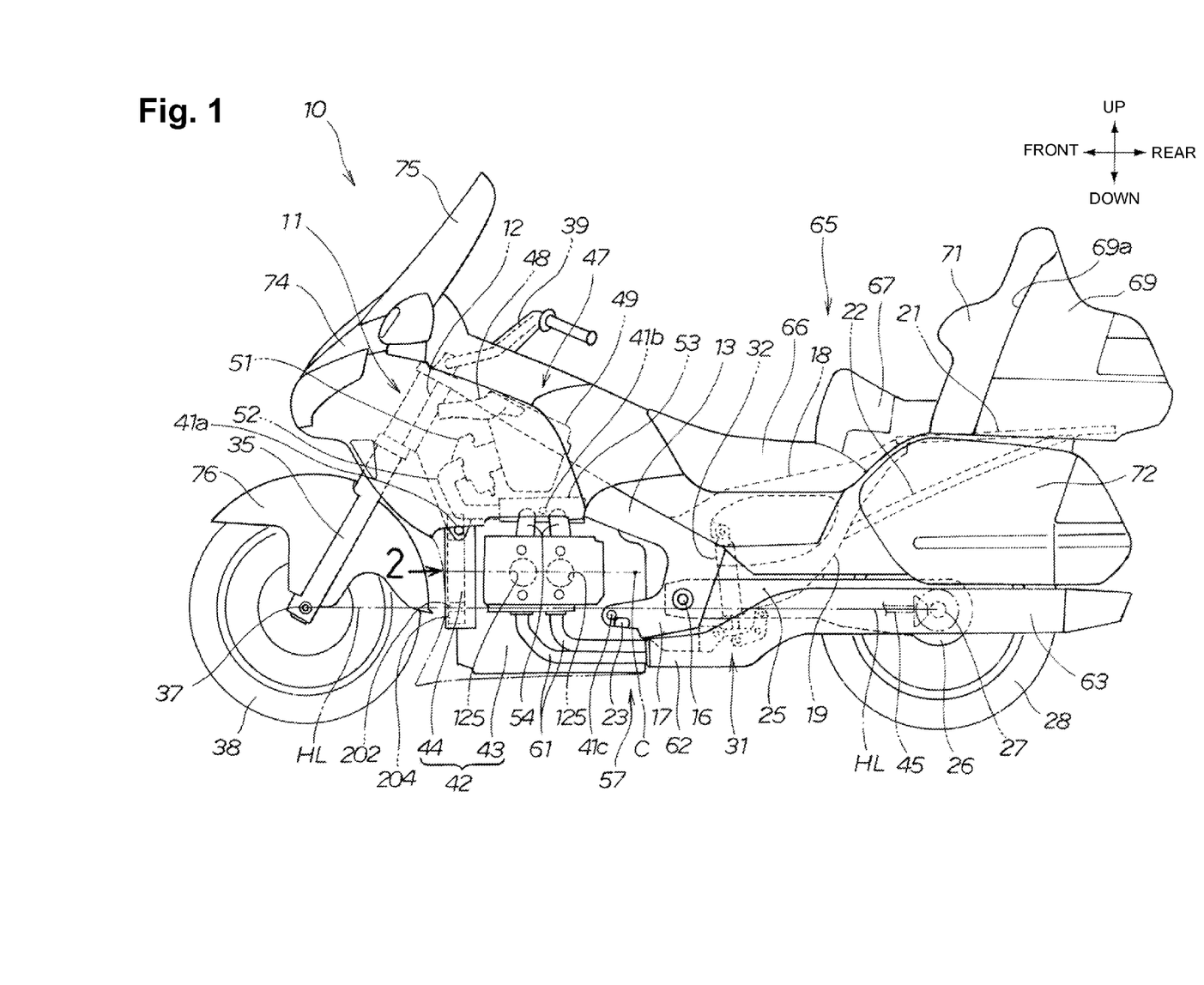
FIG. 1 is a left side view of a hybrid motorcycle according to an embodiment of the invention.

As shown in FIG. 1, a hybrid motorcycle 10 is a vehicle in which on a body frame 11 there are provided: a head pipe 12; a main frame 13 extending rearward from the head pipe 12; a pivot plate 17 being attached to the rear end of the main frame 13 and having a pivot shaft 16; a seat rail 18 extending obliquely rearward and upward from above the rear of the pivot plate 17; a middle frame 19 connecting the rear end of the seat rail 18 and the middle part of the pivot plate 17 and supporting the seat rail 18; a sub rail 21 extending rearward from the upper end of the middle frame 19; and a seat stay 22 lying across between the rear part of the sub rail 21 and the middle frame 19.

A step 23 is attached adjacently to the rear lower end of the main frame 13 as a footrest for the occupant.

The main frame 13, pivot plate 17, seat rail 18, middle frame 19, seat stay 22 and step 23 are provided on each of the left and right sides with respect to the widthwise center of the vehicle.

A rear swing arm 25 which can swing up and down around the pivot shaft 16 as a swing arm pivot is attached to the pivot plate 17; a final speed reducer 26 is integrally attached to the rear end of the rear swing arm 25; a rear wheel axle 27 is provided on the final speed reducer 26; and a rear wheel 28 is attached to the rear wheel axle 27. The driving force of an engine 43 is transmitted to a drive shaft 45 and the speed is reduced by the final speed reducer 26 provided at the rear end of the drive shaft 45; and the rotation axis direction is changed from the vehicle longitudinal direction to the vehicle width direction and the force is transmitted to the rear wheel 28.

A rear cushion unit 32 is installed upright at the middle of the rear swig arm 25 through a link mechanism 31 in which the upper end of the rear cushion unit 32 is attached on the main frame 13 side.

A front fork 35 is steerably attached to the head pipe 12, a front wheel 38 is attached to the front fork 35 through a front wheel axle 37 and a steering handlebar 39 is attached to the upper end of the front fork 35.

A power unit 42 is suspended below the main frame 13 through fastening members 41a to 41c. This power unit 42 is a hybrid driving source which is comprised of a horizontal opposed 4-cylinder engine 43 (hereinafter also called "engine 43") and a motor 44 provided on the front of the engine 43. The engine 43 is a water-cooled engine.

An intake system member 47 is disposed above the engine 43. The intake system member 47 is comprised of: an air cleaner 49 including an air duct 48 to introduce air; a throttle body 51 connected with the air cleaner 49; an intake manifold 52 extended from the throttle body 51; a surge tank 53 disposed at the tip of the intake manifold 52 to store air-fuel mixture; and intake manifolds 54 extended from the surge tank 53 to lead air-fuel mixture into cylinders of the engine 43.

An exhaust system member 57 is disposed below the engine 43. The exhaust system member 57 is comprised of: exhaust pipes 61 extending from the cylinders of the engine 43; a collecting pipe 62 combining these exhaust pipes 61; and a muffler 63 extending rearward from the collecting pipe 62.

An occupant seat 65 on which an occupant is seated is provided on the seat rail 18. The occupant seat 65 is a combination of a front seat 66 and a rear seat 67 which is provided behind and continuously with the front seat 66.

A trunk 69 for storing things is attached to a sub rail 21 and a backrest 71 for holding the occupant's back is attached to the front wall 69*a* of the trunk 69. A side bag 72 is attached to the sub rail 21.

A front cowl 74 for covering the front of the vehicle is attached to the head pipe 12; a front shield 75 as a wind screen is attached to the front cowl 74; and a front fender 76 as a mud guard for covering the upper portion of the front wheel 38 is provided on the front fork 35.

Figure 2:
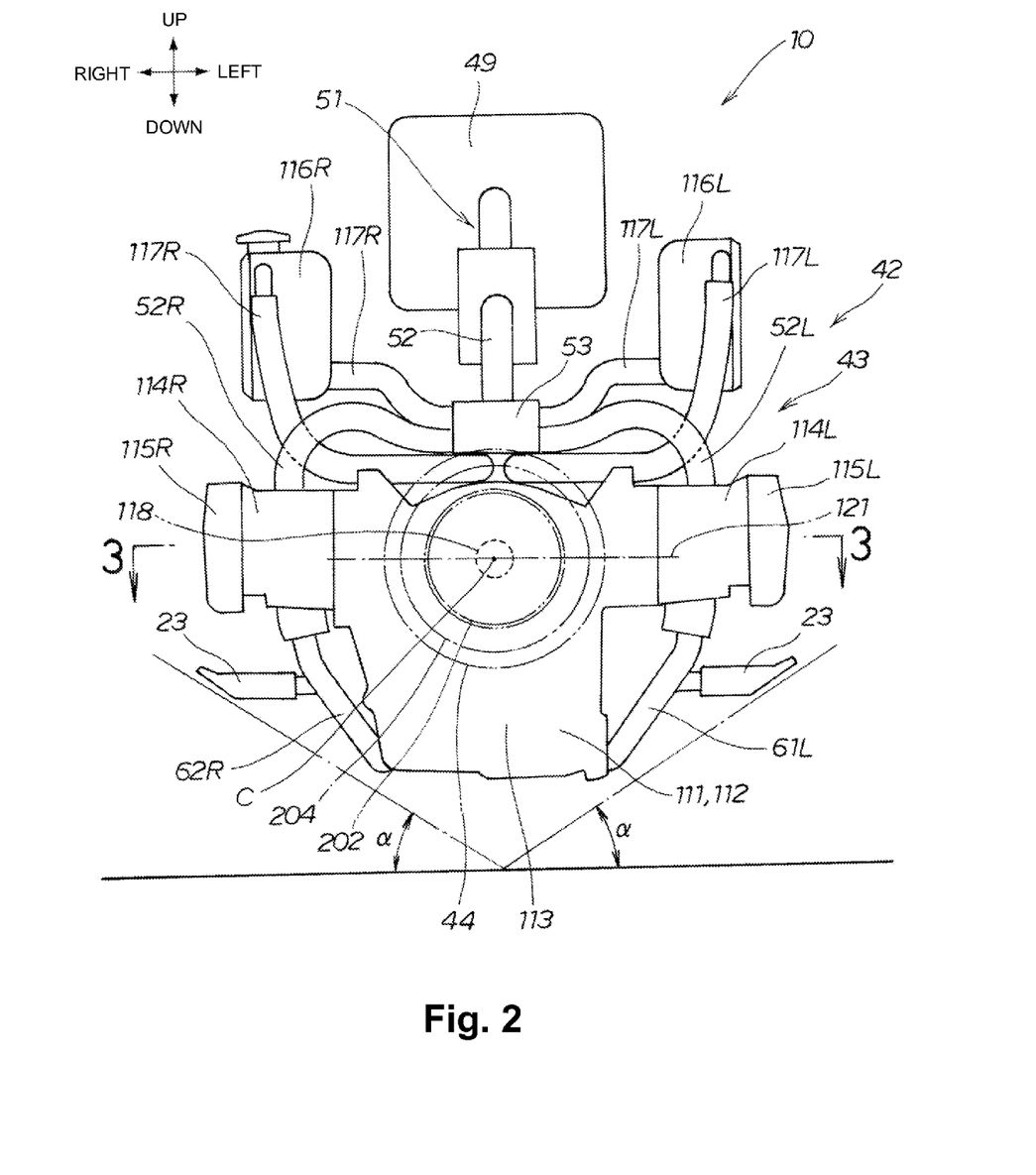
FIG. 2 is a view seen from the arrow 2 in FIG. 1.

Next, an explanation will be given of the positions of various components of the power unit 42 including the engine 43 and other details as the power unit 42 is seen from ahead.

As shown in FIG. 2, a crankcase 112, integral with a cylinder block 111, is provided in the engine 43; the motor 44 is attached to the front face 113 of the crankcase; cylinder heads 114L and 114R are attached to the left and right outer sides of the crankcase in the vehicle width direction; and head covers 115L and 115R are attached to the cylinder heads 114L and 114R.

Radiator units 116L and 116R are disposed above the cylinder heads 114L and 114R and cooling water pipes 117L and 117R with cooling water circulated therein are connected between the radiator units 116L and 116R, and the engine 43 respectively.

A crankshaft 118 extends in the vehicle longitudinal direction and a cylinder shaft 121 extends horizontally in the vehicle width direction.

Figure 3:
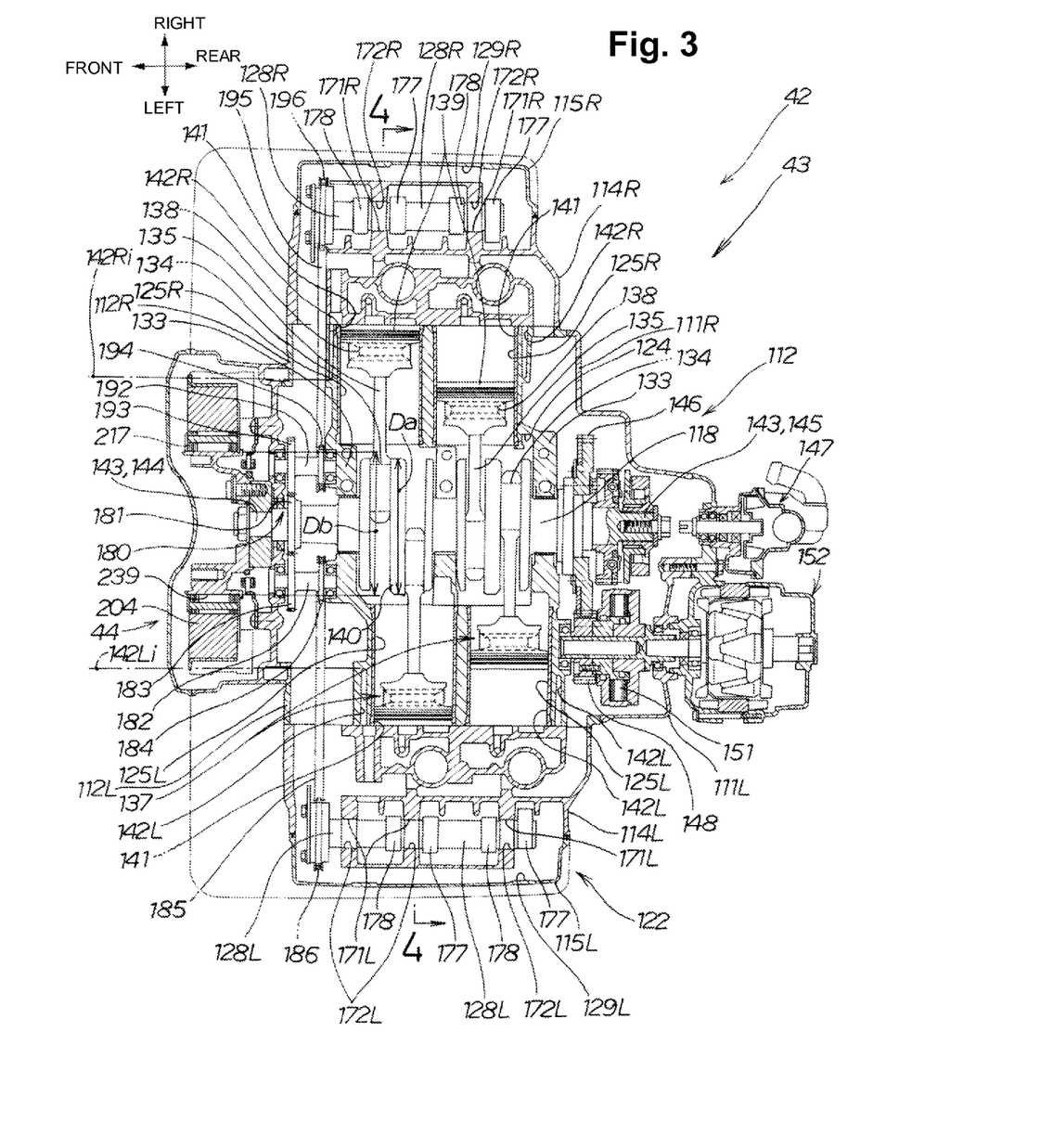
FIG. 3 is a sectional view taken along the line 3-3 in FIG. 2.

As shown in FIG. 3, the engine 43 of the power unit 42 will be described next.

An engine block 122 as a case for the engine 43 has a left crankcase 112L and a right crankcase 112L which are joined to form a crank chamber 124 therein and also includes: a crankcase 112 which combines left and right cylinder blocks 111L and 111R; left and right cylinder sections 125L and 125R as cylindrical holes made in the crankcase 112; left and right cylinder heads 114L and 114R which close the left and right cylinder sections 125L and 125R; and left and right head covers 115L and 115R which cover the left and right cylinder heads 114L and 114R and have left and right cam chambers 129L and 129R housing left and right camshafts 128L and 128R formed therein. The left and right cylinder sections 125L and 125R each have two rows and are parallel.

The crankshaft 118 is disposed as oriented in the vehicle longitudinal direction and shaft ends 143 of the crankshaft 118 of the engine include a front shaft end 144 nearer to the front wheel (reference sign 38 in FIG. 1) and a rear shaft end 145 remoter from the front wheel 38. In this embodiment, the motor 44 is provided at the front shaft end 144, an output gear 146, which receives the driving force of the transmission and transmits it, is provided at the rear shaft end 145, and a water pump 147 is disposed behind the output gear 146. A sub gear 148 is engaged with the output gear 146, a damper 151 is connected with the sub gear 148, and an AC generator (ACG) 152 is attached to the output side of the damper 151.

Although the motor 44 is located at the front shaft end 144 of the crankshaft 118 in this embodiment, the motor 44 may be located at the rear shaft end 145 of the crankshaft 118.

A plurality of cam bearings 171L and 171R are provided in the left and right cylinder blocks 111L and 111R respectively; cam holders 172L and 172R are provided in the left and right cylinder heads 114L and 114R in positions corresponding to these cam bearings 171L and 171R in a way to face them; and camshafts 128L and 128R are rotatably supported by the cam bearings 171L and 171R and the cam holders 172L and 172R.

Next, the camshafts 128L and 128R will be described.

An inlet cam 177 for pressing an intake valve 161 at a prescribed timing and an exhaust cam 178 for pressing an exhaust valve 162 at a prescribed timing are formed on the left and right camshafts 128L and 128R for each of the cylinder sections 125L and 125R. The left and right camshafts 128L and 128R are driven by a cam chain driving mechanism 180.

Next, the cam chain driving mechanism 180 will be described.

The cam chain driving mechanism 180 is comprised of: a drive gear 181 provided on the crankshaft 118; a left idle gear 183 which is engaged with the drive gear 181, each supported by a left idle shaft 182 and rotated by the drive gear 181; a left idle sprocket 184 which is formed integrally with the left idle gear 183 formed integrally with the left idle shaft 182 and has a smaller diameter than the left idle gear 183; a left chain 185 wound around the left idle sprocket 184; a left cam sprocket 186 provided on a left camshaft 128L and driven by the left chain 185; a right idle gear 193 which is engaged with the drive gear 181, each supported by a right idle shaft 192 and rotated by the drive gear 181; a right idle sprocket 194 which is formed integrally with the right idle gear 193 formed integrally with the right idle shaft 192 and has a smaller diameter than the right idle gear 193; a right chain 195 wound around the right idle sprocket 194; and a right cam sprocket 196 provided on a right camshaft 128R and driven by the right chain 195.

The motor 44 is located at the shaft end 143 of the crankshaft.

In order to enable transmission of the torque of the motor 44 to the crankshaft 118, the shaft end 143 of the crankshaft must have a prescribed shaft diameter.

Here, in a four-stroke engine, the speed ratio between the driving cam sprocket provided on the camshaft and the driven cam sprocket provided on the crankshaft is 2:1 and the ratio between the pitch circle diameter of the driving cam sprocket and the pitch circle diameter of the driven cam sprocket is 1:2.

In addition to the fact that the pitch circle diameter of the driven cam sprocket is twice as large as the pitch circle diameter of the driving cam sprocket, when the diameter of the shaft end of the crankshaft must have a prescribed diameter to enable transmission of the torque of the motor 44 to the crankshaft 118, the outside diameter of the driven cam sprocket should be even larger. For the above reason, as the outside diameter of the driven cam sprocket is larger, the head of the engine is larger, and as the head is larger, the bank angle of the vehicle may be smaller.

In this respect, according to the embodiment of the invention, the cam chain driving mechanism 180 has left and right idle gears 183 and 193 and left and right idle shafts 182 and 192 and includes left and right idle sprockets 184 and 194 which are formed integrally with the left and right idle gears 183 and 193 and are smaller in diameter than the left and right idle gears 183 and 193. Since the camshafts 128L and 128R are driven using the left and right idle sprockets 184 and 194 having a smaller diameter than the left and right idle gears 183 and 193, the outside diameter of the left and right cam sprockets 186 and 196 can be smaller. If so, it is possible to suppress the need for an increase in the size of the cylinder heads 114L and 111R of the engine 43 and if the need for an increase in the size of the cylinder heads 114L and 114R is suppressed, the bank angle of the vehicle (reference sign α in FIG. 2) can be larger.

Figure 4:
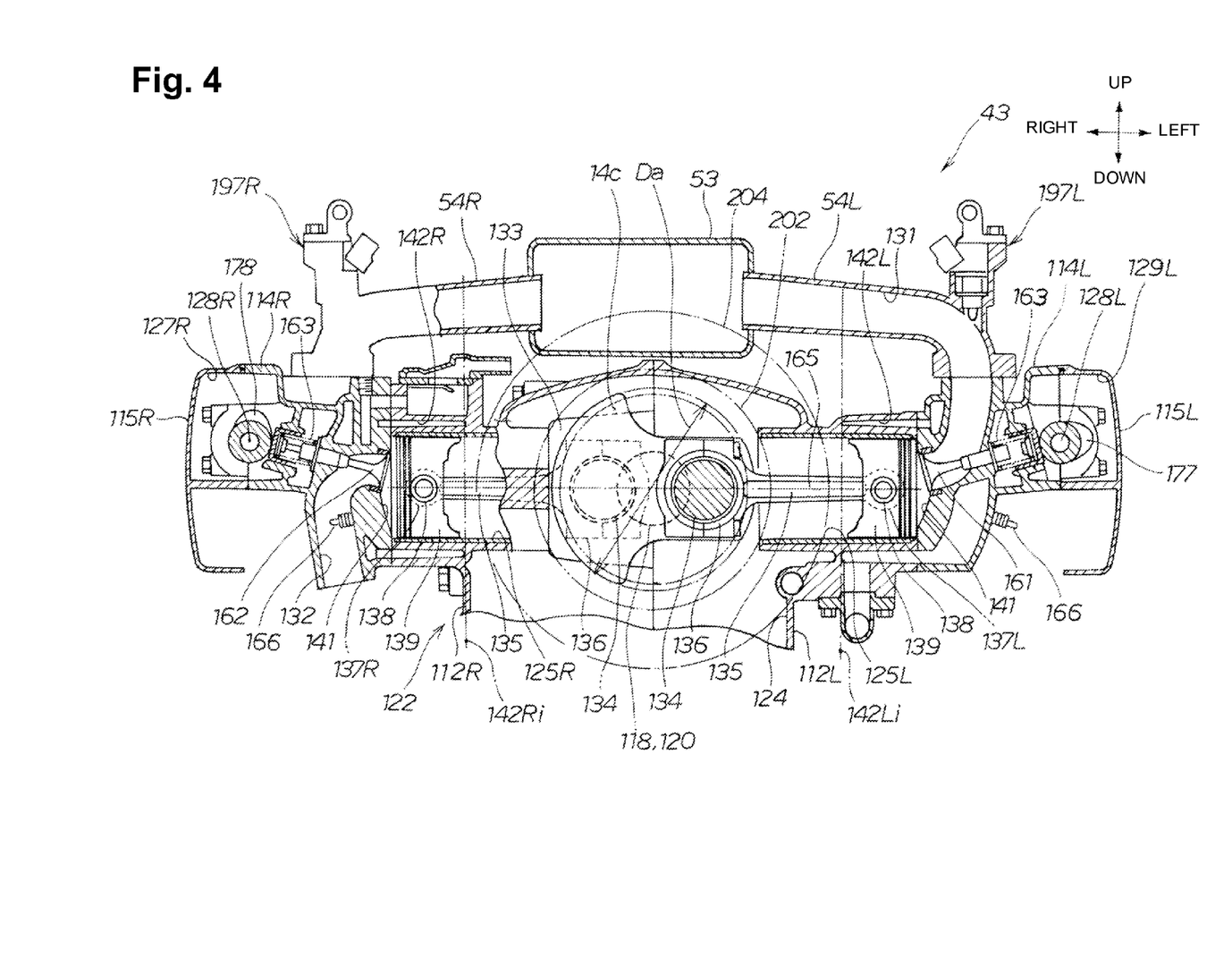
FIG. 4 is a sectional view taken along the line 4-4 in FIG. 3.

As shown in FIG. 4, the journal 120 of the crankshaft 118 is rotatably supported in the journal holder 133 of the crankcase; larger ends 136 of connecting rods 135 are rotatably attached to a plurality of crank pins 134 provided on the crankshaft 118 respectively; smaller ends 137L and 137R of the connecting rods 135 extend outward in the vehicle width direction; piston pins 138 are inserted into the smaller ends 137L and 137R of the connecting rods respectively; and pistons 139 are attached to the piston pins 138.

A plurality of crank webs 140 for connection between the crank pins 134 and the journal 120 are provided between the crank pins 134 and the journal 120.

Injectors 197L and 197R for fuel injection are attached to intake manifolds 54L and 54R.

The pistons 139 are slidably provided in the cylinder sections 125L and 125R, and combustion chambers 141 are formed between the pistons 139 and left and right cylinder sections 125L and 125R and the left and right cylinder heads 114L and 114R, respectively.

Also, as components of the crankcase 112, cooling water jackets 142L and 142R as cooling water paths are formed in the left and right cylinder blocks 111L and 111R.

The cooling water jackets 142L and 142R are formed in the cylinder sections (cylinder blocks 111L and 111R) and these jackets 142L and 142R extend leftward and rightward in the vehicle width direction beyond an outer stator section 204 when the hybrid motorcycle is seen from ahead. In other words, inner side lines 142Li and 142Ri of these jackets 142L and 142R are located outward of the outer stator section 204 in the vehicle width direction.

Next, the intake valve and exhaust valve will be described.

The intake valve 161 and exhaust valve 162, provided for each combustion chamber 141, are supported on the left and right cylinder heads 114L and 114R as biased by springs 163 toward a closing direction respectively. The intake valve 161 and exhaust valve 162 are inclined upward with respect to a plane 165 which passes through the axis lines of the cylinder sections 125L and 125R and the axis line of the crankshaft 118, and the exhaust valve 162 is disposed in a more forward position in the vehicle longitudinal direction than the intake valve 161 and they are parallel to the axis line of the crankshaft 118 and disposed in line. An ignition plug 166 is inclined downward with respect to the plane 165 and disposed in a corresponding position between the exhaust valve 162 and intake valve 161 in a way to face the center of each combustion chamber 141.

An intake port 131 and an exhaust port 132 which are communicated with the combustion chambers are formed in the cylinder heads 114L and 114R.

Figure 5:
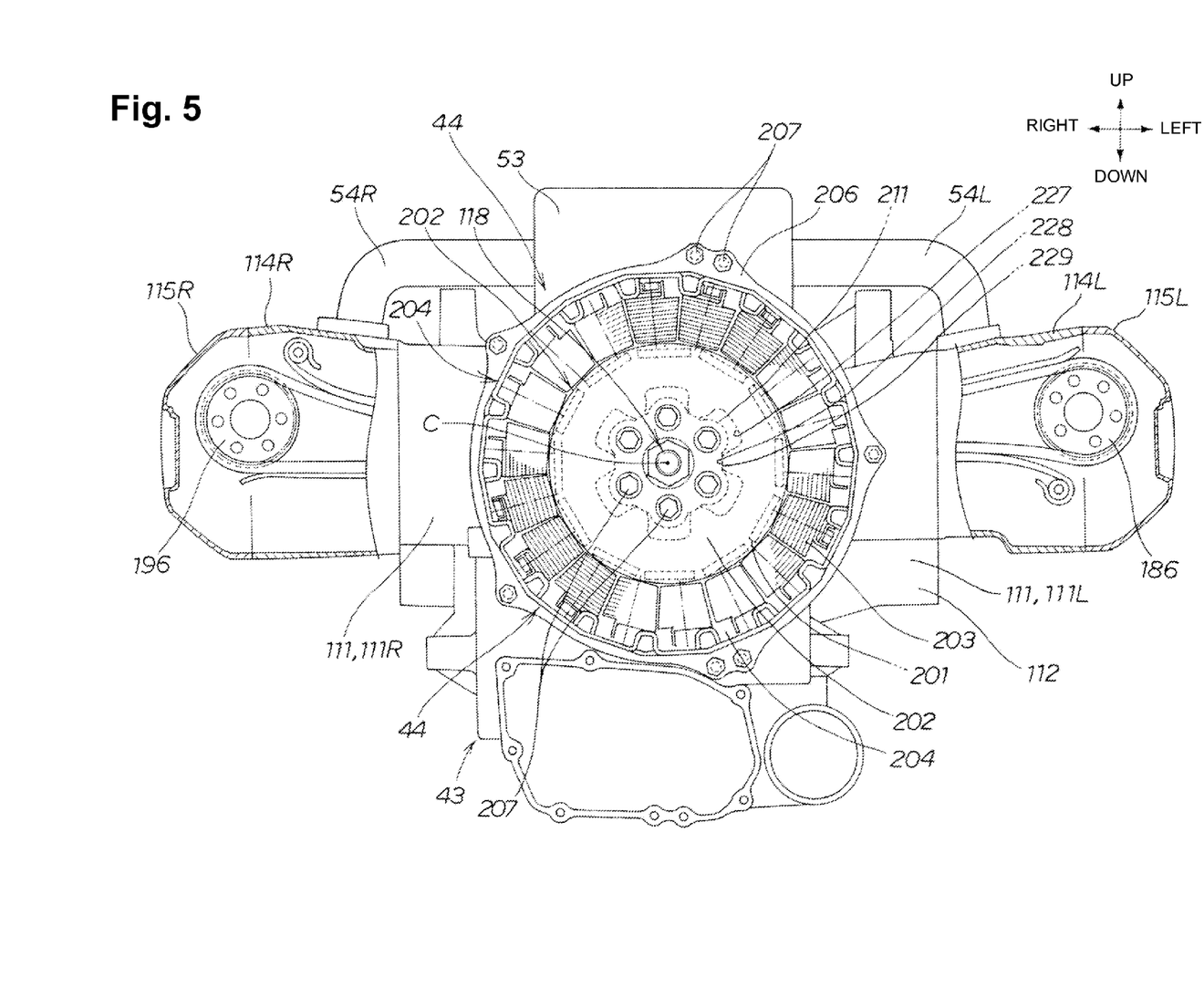
FIG. 5 is a front view of a motor provided in the motorcycle according to the embodiment of the invention.

Next, the structure of the motor will be described.

As shown in FIG. 5, the motor 44 is comprised of an inner rotor section 202 which has a plurality of magnets 201 and rotates together with the crankshaft 118, and an outer stator section 204 which is provided in an outward position in a radial direction of the inner rotor section 202 and has a plurality of coils 203 wound therein.

The outer stator section 204 has a flange 206 for attachment on its outer periphery and a plurality of fastening bolts 207 extend from the flange 206 to the cylinder 111 (cylinder block 111) of the engine with the cylinder shaft extending horizontally to fasten the outer stator section 204 to the cylinder block 111. In other words, the outer stator section 204 is attached to the crankcase 112 which combines the cylinder blocks 111L and 111R extending leftward and rightward.

Since the outer stator section 204 has the flange 206 for attachment on its outer periphery, the motor 44 can be attached to the left and right cylinders 111L and 111R when attaching the motor 44 to the engine 43, so the degree of freedom in attachment of the motor 44 can be increased. As the degree of freedom in attachment of the motor 44 is increased, the motor 44 can be easily attached to the engine 43.

Figure 6:
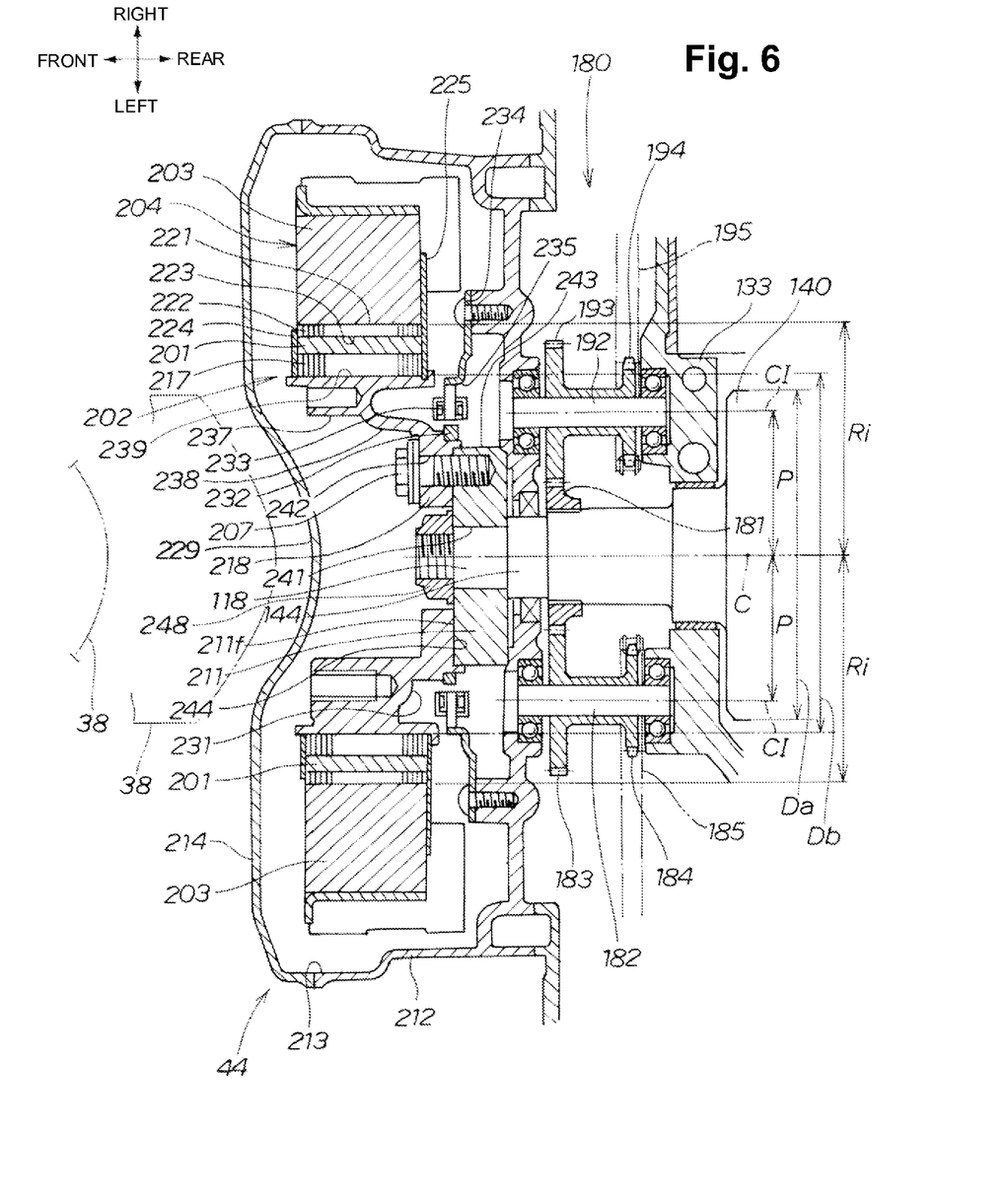
FIG. 6 is an enlarged view of an essential part of what is shown in FIG. 3.

As shown in FIG. 6, the motor 44 includes: a boss member 211 attached to the front shaft end 144 of the crankshaft; the inner rotor section 202 attached to the boss member 211; the outer stator section 204 disposed in a way to surround the inner rotor section 202 and attached to the engine 43; a motor case 212 for covering the lateral sides of the inner rotor section 202 and outer stator section 204; and a cover 214 for covering an opening 213 in the front of the motor case.

The inner rotor section 202 is attached to the boss member 211.

The inner rotor section 202 includes: a plurality of magnets 201; a rotor lamination part 217 for holding these magnets 201; and a rotor boss part 218 for attachment of the rotor lamination part 217 to the crankshaft 118.

More specifically, the rotor lamination part 217 is attached to the outer peripheral surface 239 of the rotor boss part 218.

The rotor lamination part 217 includes: magnetic pole plates 222 stacked adjacently to the outer periphery 221 of the inner rotor section; twelve magnets 201 inserted into twelve rectangular holes 223 made in these magnetic pole plates 222 as seen in a front view of the vehicle; and front and rear retaining clip plates 224 and 225 provided at both ends of the magnetic pole plates 222 to hold the stacked magnetic pole plates 222.

A magnetic pole magnet 232 in the form of a ring is attached to the back 231 of the rotor boss part, and a magnetic pole sensor 233 for detecting the magnetic pole magnet 232 is disposed in a position to face the magnetic pole magnet 232.

With a stay 234 extending toward the center of rotation, the magnetic pole sensor 233 is attached to the tip 235 of the stay 234 in the motor case 212.

The rotor boss part 218 has a bowl part 238 which has an opening 237 in a forward position of the vehicle and is recessed in the rearward direction of the vehicle and shaped like a bowl.

The cover 214 has a recess part 229 which is recessed in the rearward direction of the vehicle along the shape of the bowl part 238.

The outer stator section 204 has eighteen stator coils 203 and these stator coils 203 are disposed in a way to surround the inner rotor section 202.

The boss member 21 has, at the front shaft end 144 of the crankshaft, a center hole 241 through which the front shaft end 144 can be inserted in the center, a plurality of fastening holes 242 which are made in a way to surround the center hole 241 and enable the inner rotor section 202 to be fastened with a plurality of fastening bolts 207, and at a rim 243, the recess part 229 as a boss side fitting part formed to fit a claw 228 as a rotor side fitting part formed on the rear face 244 of the inner rotor section.

The front shaft end 144 is inserted into the center hole 241, the boss member 211 is fixed on the crankshaft 118 with a main nut 248, and with the rear face 244 of the inner rotor section in contact with the front face 211f of the boss member, the fastening bolts 207 are screwed into the six fastening holes 242 to fix the inner rotor section 202 on the boss member 211.

Next, the positional relations between the left and right idle shafts 182 and 192 as components of the cam driving mechanism and the inner rotor section 202 as a component of the motor 44 and other details will be described.

The left and right idle shafts 182 and 192 are disposed in a more inward position than the outer periphery 221 of the inner rotor section. More specifically, the distance (P) from the center C of the crankshaft to the center CI of the idle shafts is smaller than distance (Ri), half of the outside diameter of the inner rotor section.

The outer stator section 204 is disposed outward of the left and right idle shafts 182 and 192 and the outer stator section 204 is not influenced, so freedom in attachment of the outer stator section 204 is ensured.

The outside diameter Da (diameter Da) of the crank web 140 is larger than the interval between the idle shafts (2P) (2P<Da), smaller than the outside diameter Db (diameter Db) of the outer peripheral surface 239 of the rotor boss part 218 (Da<Db), and smaller than the outside diameter (2Ri) of the outer periphery 221 of the inner rotor section 202 (Da<2Ri). Here, the outside diameter (2Ri) of the outer periphery 221 of the inner rotor section 202 is slightly smaller than the inside diameter of the outer stator section 204.

Referring back to FIG. 5, as seen in a front view of the vehicle, a rotor boss part 227, formed on the inner peripheral surface of the inner rotor, has a plurality of claws 228 as projecting claws protruding toward the shaft center C of the crankshaft and a plurality of recess parts 229 which can fit these claws 228 are formed on the boss member 211. By fitting the rotor boss part 218 formed on the inner peripheral surface 226 of the inner rotor section into the recess parts 229 of the boss member, the inner rotor section 202 can be securely fixed on the crankshaft 118, thereby preventing occurrence of phase shifting between the crankshaft 118 and the inner rotor section 202.

Referring back to FIG. 3, the engine 43 has a plurality of cylinder sections 125L and 125R extending leftward and rightward in the vehicle width direction with respect to the crankshaft 118 and these cylinder sections 125L and 125R have cooling water jackets 142L and 142R through which cooling water flows and which extend leftward and rightward in the vehicle width direction beyond the outer stator section 204 when the hybrid motorcycle is seen from ahead.

The cylinder sections 125L and 125R have the cooling water jackets 142L and 142R extending leftward and rightward in the vehicle width direction beyond the outer stator section 204, in which cooling water flows. Since the cooling water jackets 142L and 142R of the engine are not covered by the outer stator section 204 of the motor, running wind which flows rearward from ahead of the vehicle hits the cooling water jackets 142L and 142R of the engine so that the running wind can cool the engine 43 adequately.

Next, how the abovementioned hybrid motorcycle functions will be described.

Since the crankshaft 118 is disposed as oriented in the vehicle longitudinal direction and the motor is located at the front shaft end 144 of the crankshaft, even if the crankshaft 118 of the engine is long, the motor 44 can be mounted on the motorcycle (reference sign 10 in FIG. 2) without affecting the bank angle (reference sign α in FIG. 2) of the vehicle.

In addition, the motor 44 is located at the front shaft end 144 adjacent to the front wheel 38. When the motor 44 is located at the front shaft end 144 adjacent to the front wheel 38, running wind is hardly blocked. Since running wind is hardly blocked, the motor 44 is cooled surely.

Figure 7A:
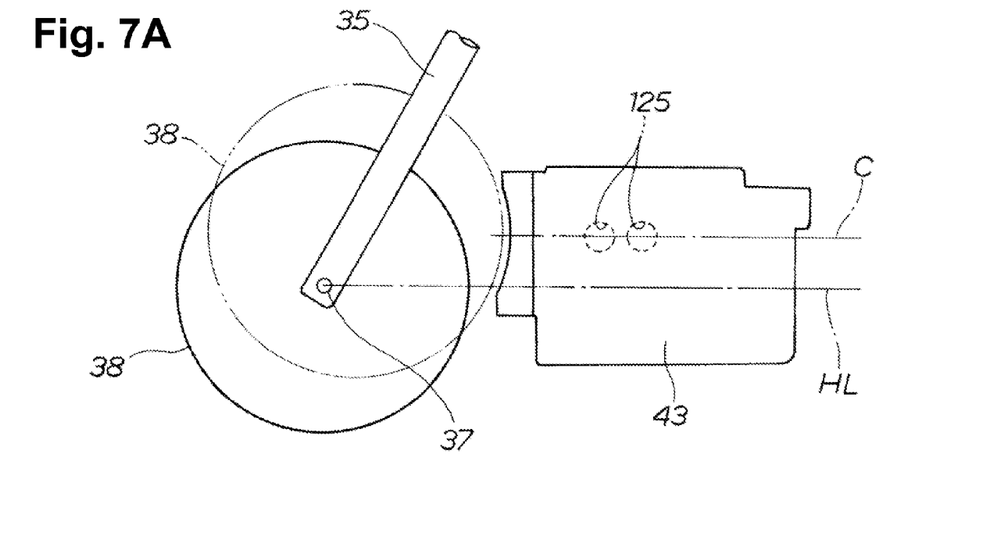
FIGS. 7A and 7B are views illustrating how the motorcycle according to the embodiment of the invention functions.
Figure 7B:
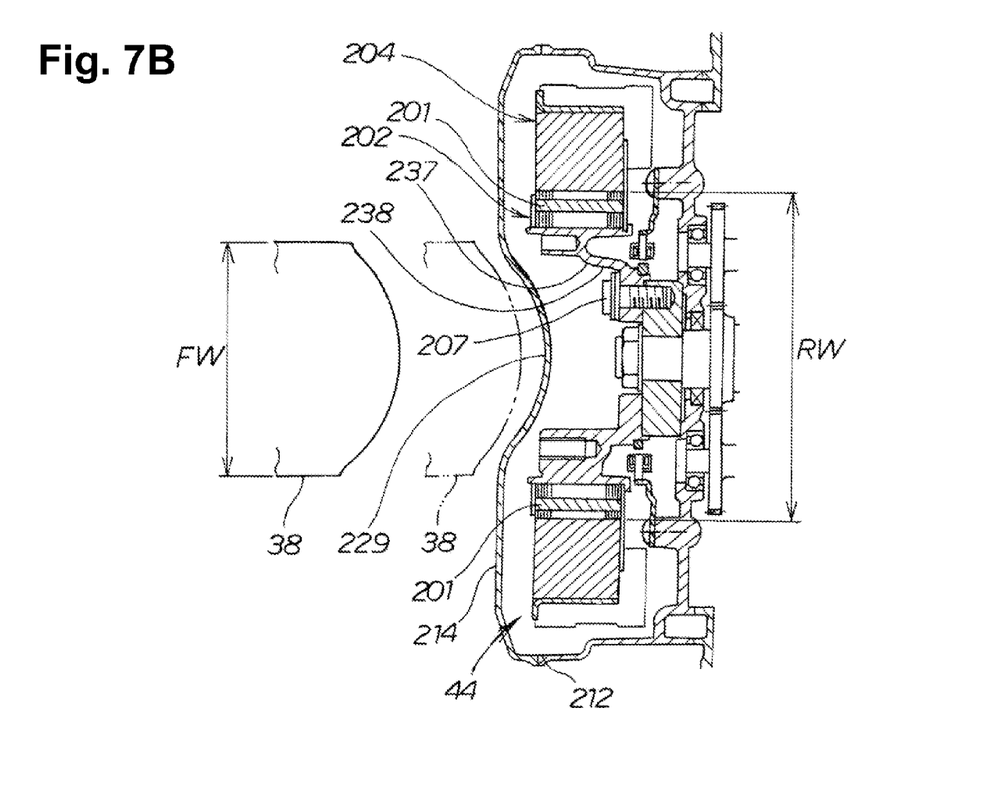

Referring to FIGS. 7A and 7B, when the front wheel 38 absorbs a shock from the road surface, the front wheel 38, attached to the lower end of the front fork 35, may move up to a position indicated by the imaginary line in drawing by the action of the front fork 35. Here, the inner rotor section 202 has the bowl part 238 which has an opening 237 in a forward position of the vehicle and is shaped like a bowl and the recess part 229 is formed along the shape of the bowl part 238 on the cover 214 which closes the front of the inner rotor section 202.

If the inner rotor section has no opening, there would be a constraint in attaching the front wheel near the inner rotor. Also, if the motor performance is to be enhanced, the front wheel would have to be moved forward in order to avoid interference with the inner rotor. To do so, the wheel base of the vehicle must be longer, maybe resulting in a larger vehicle size.

In this respect, according to the embodiment of the invention, the inner rotor section 202 has an opening 237 in a forward position of the vehicle. Due to the existence of this opening 237, the front wheel 38 and the inner rotor section 202 can be disposed close to each other and the clearance between the front wheel 38 and the inner rotor section 202 can be made small in order to avoid an increase in vehicle size. Furthermore, the performance of the motor 44 can be enhanced without an increase in vehicle size.

Since the inner rotor section 202 is shaped like a bowl, it is possible to increase the outside diameter of the inner rotor section 202 and, at the same time, control the weight of the inner rotor section 202. If the weight of the inner rotor section 202 can be controlled, the required rigidity of the crankshaft 118 can be minimized, thereby contributing to reduction in the weight of the engine 43.

The center C of the inner rotor section 202 is located above a line (HL) connecting the axle 37 of the front wheel and the axle 27 of the rear wheel. The center C of the inner rotor section is also the center C of the crankshaft.

When a stroke occurs in the front wheel 38 during running, the front wheel 38 moves toward the bowl part 238 having the opening 237 at its front, so a sufficient clearance can be obtained between the front wheel 38 and the motor 44. When the sufficient clearance between the front wheel 38 and the motor 44 is secured, it is possible to dispose the large high-output motor 44.

Although in the inner rotor section 202 the center C of the inner rotor is located above the line HL connecting the axle 37 of the front wheel and the axle 27 of the rear wheel in this embodiment, instead the center C of the inner rotor may be on the line connecting the axle 37 of the front wheel and the axle 27 of the rear wheel.

As shown in FIG. 7B, the outside width (RW) of the inner rotor section is larger than the width (FW) of the front wheel when the hybrid motorcycle is seen from above.

The outer stator section 204 with wound coils 203 is disposed in an outward position in a radial direction of the inner rotor section 202 and the outside width (RW) of the inner rotor section is larger than the width (FW) of the front wheel. In other words, the outer stator section 204, which generates heat, is disposed outward of the front wheel 38. Therefore, running wind hits the outer stator section 204 without being blocked by the front wheel 38 so that it can cool the motor 44 adequately.

Although the outside width of the inner rotor section is larger than the width of the front wheel in this embodiment, instead the outside width of the inner rotor section may be substantially equal to the width of the front wheel.

The plural magnets 201 provided in the inner rotor section 202 are disposed beyond the width (FW) of the front wheel 38 when the hybrid motorcycle is seen from above.

If the magnets are disposed inside of the width of the front wheel, they would be more likely to be hit by a flying stone from the front wheel.

In this respect, according to the embodiment of the invention, the magnets 201 provided in the inner rotor section 202 are disposed beyond the width of the front wheel 38, so the possibility that they are hit by a flying stone from the front wheel 38 during running is reduced. Since the influence of a flying stone from the front wheel 38 is smaller, the need for an excessive cover member to cover the motor 44 is eliminated. When there is no need to cover the excessive cover member, an increase in vehicle weight can be avoided.

The embodiments of this invention are applied to motorcycles; however it may be applied to three-wheeled vehicles and also general vehicles.

The embodiments of this invention are suitable for hybrid motorcycles which are driven by a hybrid driving source comprised of an engine and a motor.

In the embodiment of the invention, since the crankshaft is disposed on a front part of the body frame as oriented in the vehicle longitudinal direction and the motor is located at a shaft end of the crankshaft, even if the crankshaft of the engine is long, the motor as a hybrid motor which depends on the desired output size can be mounted on the motorcycle without affecting the bank angle of the vehicle.

When the motor is provided at a shaft end of the crankshaft extending in the vehicle longitudinal direction, the motor is disposed at either the front shaft end or rear shaft end of the crankshaft. If it is located at the rear shaft end of the crankshaft, running wind from ahead of the vehicle would be blocked by the engine and hardly hit the motor.

In this respect, according to the embodiment of the invention, the motor is located at the front shaft end of the crankshaft, so running wind can hit the motor adequately to promote cooling of the motor.

In the embodiment of the invention, the outer stator section with a wound coil is disposed in an outward position in a radial direction of the inner rotor section and the outside width of the inner rotor section is substantially equal to the width of the front wheel or larger than the width of the front wheel.

There is a tendency that running wind from ahead of the vehicle is divided by the front wheel into left and right air flows along the lateral faces of the front wheel. The outer stator section generates a larger amount of heat due to the wound coil. This outer stator section can be positively exposed to the air flows along the lateral faces of the front wheel so that the outer stator section can be effectively cooled.

In the embodiment of the invention, the magnet provided in the inner rotor section is disposed outside of the width of the front wheel.

If the magnet is disposed inside of the width of the front wheel, a flying stone from the front wheel would be more likely to hit the magnet.

In this respect, according to the embodiment of the invention, the magnet provided in the inner rotor section is disposed outside of the width of the front wheel. When the magnet is disposed outside of the width of the front wheel, a flying stone from the front wheel during running hardly hits the magnet. Since the influence of a flying stone from the front wheel is smaller, the need for an excessive cover member to cover the motor is eliminated. When there is no need for an excessive cover member, an increase in vehicle weight can be avoided.

In the embodiment of the invention, the cylinder sections include cooling water jackets, extending leftward and rightward in the vehicle width direction to a point where they do not overlap the outer stator section, in which cooling water flows. In other words, as seen in a front view of the vehicle, the cooling water jackets of the engine are visible. Therefore, running wind which flows rearward from ahead of the vehicle hits the cooling water jackets of the engine, so that the running wind can cool the engine adequately.

In the embodiment of the invention, the motor is located at a shaft end of the crankshaft and in order to enable transmission of the torque of the motor to the crankshaft, the shaft end of the crankshaft must have a prescribed shaft diameter.

Furthermore, in a four-stroke engine, the gear ratio between the driving cam sprocket provided on the camshaft and the driven cam sprocket provided on the crankshaft is 1:2 and the ratio between the pitch circle diameter of the driving cam sprocket and the pitch circle diameter of the driven cam sprocket is 1:2.

Not only because the shaft end of the crankshaft must have a prescribed diameter but also because the pitch circle diameter of the driven cam sprocket is twice as large as the pitch circle diameter of the driving cam sprocket, the outside diameter of the driven cam sprocket should be even larger. As the outside diameter of the driven cam sprocket is larger, the head of the engine should be larger, and as the head is larger, the bank angle of the vehicle may be smaller.

In this respect, according to the embodiment of the invention, the cam chain driving mechanism has idle gears and idle shafts and includes idle sprockets which are formed integrally with the idle gears and are smaller in diameter than the idle gears. Since the camshafts are driven using the idle sprockets having a smaller diameter than the idle gears, the outside diameter of the driven cam sprockets can be smaller. If so, the heads of the engine no longer need to be large and if there is no need for larger heads, the bank angle of the vehicle can be larger.

In the embodiment of the invention, the distance from the center of the crankshaft to the centers of the idle shafts is smaller than half of the outside diameter of the inner rotor section. In other words, the idle shafts are disposed inward of the outer periphery of the inner rotor section. Since the outer stator section is disposed outward of the idle shafts, freedom in attachment of the outer stator is ensured.

In the embodiment of the invention, the cylinder shaft is horizontal in both the left and right cylinders of the engine. When the hybrid motorcycle is seen from ahead, the lateral faces of the left and right cylinders look large. Due to these lateral faces, it is easy to get many supporting points for the motor. Thus, the degree of freedom in attachment of the motor can be enhanced.

In the embodiment of the invention, the inner rotor section is shaped like a bowl. Since it is bowl-shaped, it is possible that its outer peripheral portion is thick and its central portion is hollow. Therefore, because it is bowl-shaped, the weight of the inner rotor section can be reduced. When the weight of the inner rotor section is reduced, the load on the crankshaft can be reduced, contributing to reduction in the weight of the engine.

In addition, the inner rotor section has an opening in a forward position of the vehicle.

If the inner rotor section has no opening, there would be a constraint in attaching the front wheel near the inner rotor. Also, if the motor performance is to be enhanced, the front wheel has to be moved forward in order to avoid interference with the inner rotor. To do so, the wheel base should be larger, and if the wheel base is larger, the vehicle size should be larger.

In this respect, according to the embodiment of the invention, the inner rotor section has an opening in a forward position of the vehicle. Due to the existence of this opening, the front wheel and the inner rotor can be disposed close to each other and the clearance between the front wheel and the inner rotor can be made small in order to suppress the need for an increase in vehicle size. Furthermore, the performance of the motor can be enhanced without an increase in vehicle size.

In the embodiment of the invention, a center of the inner rotor section is located on or above the line connecting the axle of the front wheel and the axle of the rear wheel. When a stroke occurs in the front wheel during running, the front wheel moves toward the bowl part having the opening at its front, so a sufficient clearance can be obtained between the front wheel and the motor. When the clearance between the front wheel and the motor is sufficient, the motor can be a large high-output motor.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the united states is:

1. A hybrid motorcycle comprising:
   a body frame;
   a front wheel; and
   a hybrid driving source mounted on the body frame between a head pipe and a swing arm pivot and comprising:
      an engine having a crankshaft whose axial direction is substantially parallel to a vehicle longitudinal direction; and
      a motor provided at a front shaft end adjacent to the front wheel,
   wherein the motor comprises
      an inner rotor section having a magnet and being configured to rotate together with the crankshaft, the inner rotor section having an outside width that is substantially equal to a width of the front wheel or larger than the width of the front wheel when the hybrid motorcycle is seen from above, and
      an outer stator section which is disposed in an outward position in a radial direction of the inner rotor section and has a coil wound around the outer stator section.

2. The hybrid motorcycle according to claim 1, wherein the magnet provided in the inner rotor section is disposed beyond a width of the front wheel when the hybrid motorcycle is seen from above.

3. The hybrid motorcycle according to claim 1, wherein the engine comprises a plurality of cylinder sections extending leftward and rightward with respect to the crankshaft in a vehicle width direction, the cylinder sections comprising cooling water jackets through which cooling water flows, the cooling water jackets extending leftward and rightward in the vehicle width direction beyond the outer stator section when the hybrid motorcycle is seen from ahead.

4. The hybrid motorcycle according to claim 1,
   wherein the engine comprises a cam chain driving mechanism disposed near the inner rotor section, the cam chain driving mechanism comprising:
      a drive gear provided on the crankshaft;
      an idle gear supported on a crankcase of the engine by idle shafts and rotated by the drive gear;
      an idle sprocket formed integrally with the idle gear and having a smaller diameter than the idle gear;
      a chain wound around the idle sprocket; and
      a cam sprocket provided on a camshaft and driven by the chain.

5. The hybrid motorcycle according to claim 4, wherein a distance from a center of the crankshaft to a center of the idle shaft is smaller than half of an outside diameter of the inner rotor section.

6. The hybrid motorcycle according to claim 3, wherein in the cylinder sections, a cylinder shaft is horizontal.

7. The hybrid motorcycle according to claim 1, wherein the inner rotor section comprises
   a rotor lamination part holding the magnet, and
   a rotor boss part attaching the rotor lamination part to the crankshaft, the rotor boss part being shaped like a bowl with an opening in a vehicle forward position.

8. The hybrid motorcycle according to claim 7, wherein in the inner rotor section a center of the inner rotor section is located on or above a line connecting an axle of the front wheel and an axle of a rear wheel.

9. The hybrid motorcycle according to claim 2, wherein the engine comprises a plurality of cylinder sections extending leftward and rightward with respect to the crankshaft in a vehicle width direction, the cylinder sections comprising cooling water jackets through which cooling water flows, the cooling water jackets extending leftward and rightward in the vehicle width direction beyond the outer stator section when the hybrid motorcycle is seen from ahead.

10. The hybrid motorcycle according to claim 2,
    wherein the engine comprises a cam chain driving mechanism disposed near the inner rotor section, the cam chain driving mechanism comprising:
       a drive gear provided on the crankshaft;
       an idle gear supported on a crankcase of the engine by idle shafts and rotated by the drive gear;
       an idle sprocket formed integrally with the idle gear and having a smaller diameter than the idle gear;
       a chain wound around the idle sprocket; and
       a cam sprocket provided on a camshaft and driven by the chain.

11. The hybrid motorcycle according to claim 3,
    wherein the engine comprises a cam chain driving mechanism disposed near the inner rotor section, the cam chain driving mechanism comprising:
       a drive gear provided on the crankshaft;
       an idle gear supported on a crankcase of the engine by idle shafts and rotated by the drive gear;
       an idle sprocket formed integrally with the idle gear and having a smaller diameter than the idle gear;
       a chain wound around the idle sprocket; and
       a cam sprocket provided on a camshaft and driven by the chain.

12. The hybrid motorcycle according to claim 9,
    wherein the engine comprises a cam chain driving mechanism disposed near the inner rotor section, the cam chain driving mechanism comprising:
       a drive gear provided on the crankshaft;
       an idle gear supported on a crankcase of the engine by idle shafts and rotated by the drive gear;
       an idle sprocket formed integrally with the idle gear and having a smaller diameter than the idle gear;
       a chain wound around the idle sprocket; and
       a cam sprocket provided on a camshaft and driven by the chain.

13. The hybrid motorcycle according to claim 2, wherein the inner rotor section comprises
    a rotor lamination part holding the magnet, and a rotor boss part attaching the rotor lamination part to the crankshaft, the rotor boss part being shaped like a bowl with an opening in a vehicle forward position.

14. The hybrid motorcycle according to claim 3, wherein the inner rotor section comprises
    a rotor lamination part holding the magnet, and
    a rotor boss part attaching the rotor lamination part to the crankshaft, the rotor boss part being shaped like a bowl with an opening in a vehicle forward position.

15. The hybrid motorcycle according to claim 4, wherein the inner rotor section comprises
    a rotor lamination part holding the magnet, and
    a rotor boss part attaching the rotor lamination part to the crankshaft, the rotor boss part being shaped like a bowl with an opening in a vehicle forward position.

16. The hybrid motorcycle according to claim 5, wherein the inner rotor section comprises
    a rotor lamination part holding the magnet, and
    a rotor boss part attaching the rotor lamination part to the crankshaft, the rotor boss part being shaped like a bowl with an opening in a vehicle forward position.

17. The hybrid motorcycle according to claim 6, wherein the inner rotor section comprises
    a rotor lamination part holding the magnet, and
    a rotor boss part attaching the rotor lamination part to the crankshaft, the rotor boss part being shaped like a bowl with an opening in a vehicle forward position.

* * * * *